United States Patent [19]

Moeser

[11] 4,401,287
[45] Aug. 30, 1983

[54] SWIVEL ASSEMBLY

[75] Inventor: Denis S. Moeser, Clayton, Mo.

[73] Assignee: Leisure Products, Inc., St. Louis, Mo.

[21] Appl. No.: 289,110

[22] Filed: Jul. 31, 1981

[51] Int. Cl.³ .................... F16M 13/00; A47C 3/18
[52] U.S. Cl. .................................. 248/425; 248/349
[58] Field of Search ............. 248/425, 415, 131, 418, 248/186, 349; 108/139, 142; 297/349

[56] References Cited

U.S. PATENT DOCUMENTS

| | | | |
|---|---|---|---|
| 1,717,311 | 6/1929 | Brooks | 248/425 |
| 2,937,396 | 5/1960 | Momberg et al. | 248/349 X |
| 3,113,804 | 12/1963 | Ritter | 297/252 |
| 3,570,800 | 3/1971 | Cycowicz | 248/415 |
| 3,637,185 | 1/1972 | Mikos et al. | 248/425 |
| 3,789,444 | 2/1974 | McCord | 9/7 |
| 3,821,825 | 7/1974 | Bailey | 297/349 X |
| 4,226,398 | 10/1980 | Freber | 248/131 X |

Primary Examiner—William E. Lyddane
Assistant Examiner—Sarah A. Lechok
Attorney, Agent, or Firm—Senniger, Powers, Leavitt and Roedel

[57] ABSTRACT

A swivel assembly comprising a base plate, a swivel plate mounted on the base plate for rotation relative thereto, bearing elements between the opposing inner faces of the plates, and a fastener connecting the plates. The fastener comprises a bolt having a head on the outer face of the base plate, and a threaded shank extending through axially aligned holes in the plates. The fastener further comprises a nut on the outer face of the swivel plate threaded on the bolt for drawing the swivel plate toward the base plate against the bearing elements. Both the head of the bolt and the nut are freely rotatable relative to the plates, with the head of the bolt being generally accessible for being turned, and the nut being rendered generally inaccessible by an object mounted on the outer face of the swivel plate. A lock selectively holds the nut in fixed angular position relative to the swivel plate to ensure relative rotation of the nut and bolt upon turning the head of the bolt, whereby the resistance of the swivel plate to rotation relative to the base plate may be adjusted.

12 Claims, 5 Drawing Figures

SWIVEL ASSEMBLY

BACKGROUND OF THE INVENTION

This invention relates to a swivel assembly, and more particularly to a swivel assembly for rotatably mounting an object, such as a boat seat, on a support structure, such as a boat thwart.

The swivel assembly of this invention represents an improvement over conventional boat seat swivel assemblies of the type including a base plate which may be detachably secured to the thwart of a boat, an opposing swivel plate which mounts a boat seat for rotation relative to the base plate, bearings between the opposing inner faces of the plates, and a fastener extending through axially aligned holes in the plates for drawing the plates against the bearings and defining an axis about which the swivel plate rotates. Reference may be made to U.S. Pat. Nos. 3,113,804, 3,789,444 and 3,821,825 showing swivel assemblies of this type.

As manufactured, the prior art swivel assemblies have had a resistance to rotation which is sufficient to prevent the boat seat from turning indiscriminately (as during the ordinary slight rocking action of a boat) but is not so great as to prevent the user from readily swivelling the seat when he desires to do so. However, with usage of the boat seat, the resistance tends to decrease, and there has been no satisfactory provision for enabling adjustment of the resistance to compensate for this decrease. While some assemblies have a nut-and-bolt fastener, tightening of the fastener to draw the swivel plate into more forceful engagement against the bearings to increase the resistance to rotation is difficult if not impossible. This is because access to the fastener for the purposes of tightening it is normally blocked by the boat seat, which, if not permanently secured to the swivel plate, is usually difficult to remove. Turning the fastening element merely from the outer face of the base plate, which is accessible upon removal of the swivel assembly from the boat thwart, simply results in the nut and bolt turning together as a unit.

SUMMARY OF THE INVENTION

Among the several objects of this invention may be noted the provision of an improved swivel assembly of the above-noted type; the provision of such a swivel assembly in which adjustment of the resistance of the swivel plate to rotation relative to the base plate may readily be made; the provision of such a swivel assembly in which turning of only one fastening member (viz., the one accessible from the outer face of the base plate) is necessary to effect the adjustment; and the provision of such as improved swivel assembly which is simple and economical in construction yet durable.

In general, a swivel assembly of this invention comprises a base plate, a swivel plate mounted on the base plate for rotation relative to the base plate in a plane generally parallel to but spaced from that of the base plate, bearing means between the opposing inner faces of the plates, and means for adjusting the resistance of the swivel plate to rotation relative to the base plate. The adjusting means comprises first and second fastening members. The first fastening member comprises a bolt having a head on the outer face of one plate, and a threaded shank extending through axially aligned holes in the plates and defining an axis about which the swivel plate rotates. The second fastening member comprises a nut on the outer face of the other plate threadable on the shank of the bolt for drawing the swivel plate toward the base plate against the bearing means. Both fastening members are freely rotatable relative to the plates, with one of the fastening members being accessible for being turned from the outer face of the base plate, and the other being rendered generally inaccessible by an object mounted on the outer face of the swivel plate. Locking means selectively holds the inaccessible fastening member in fixed angular position relative to the swivel plate to ensure relative rotation of the fastening members upon turning the accessible fastening member, whereby the resistance of the swivel plate to rotation may be adjusted.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
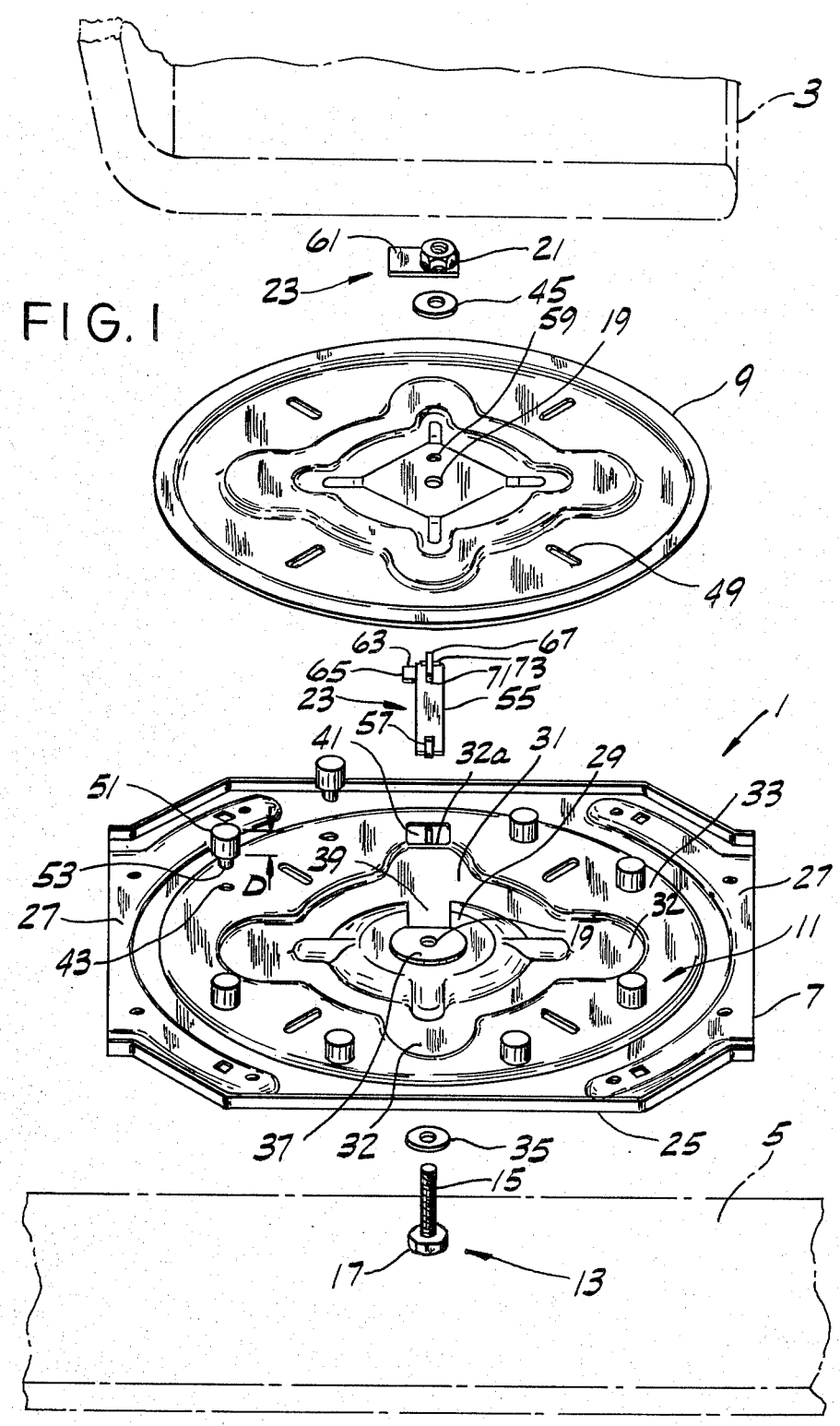
FIG. 1 is an exploded perspective of a swivel assembly of this invention, showing, in phantom, a boat thwart on which the swivel assembly is to be mounted and a boat seat to be supported by the swivel assembly.
Figure 2:
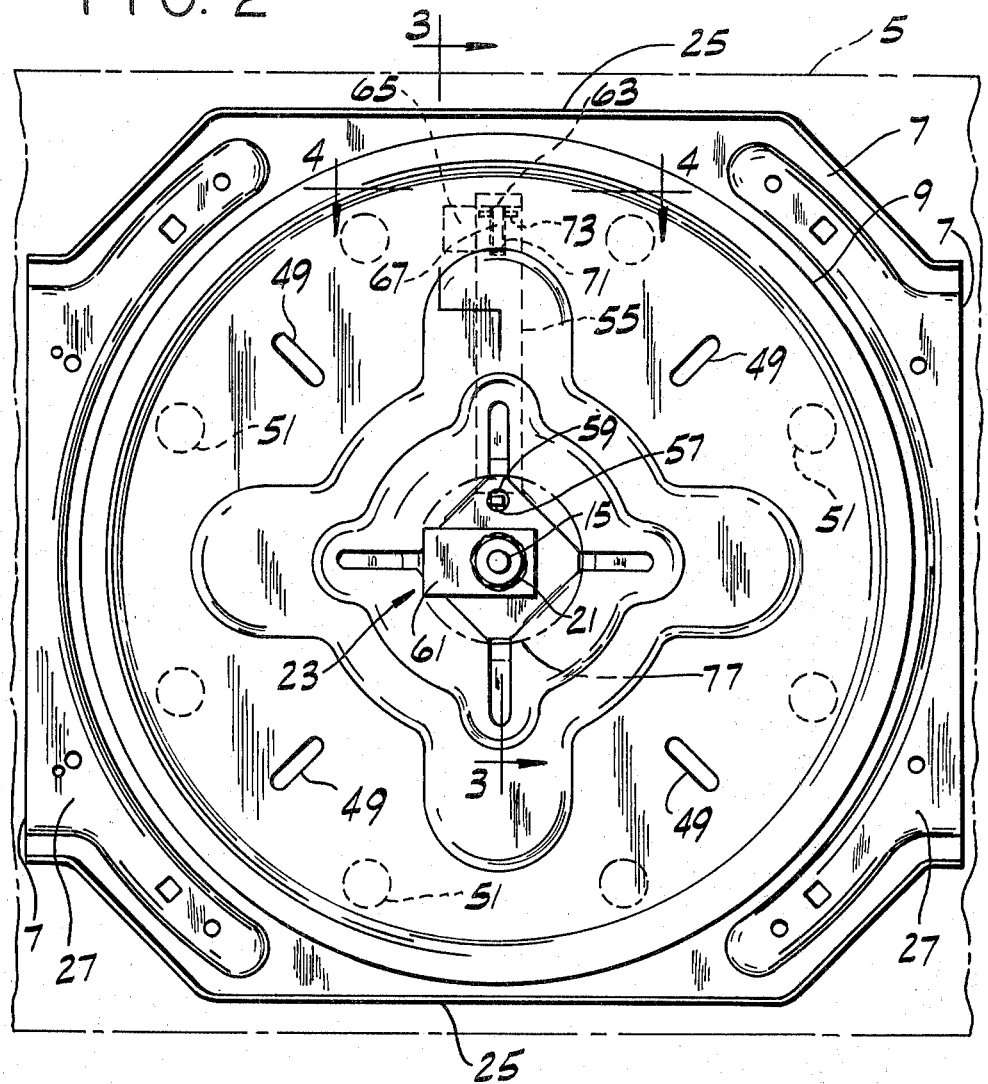
FIG. 2 is a top plan of the swivel assembly, as assembled and mounted on the boat thwart.

Referring now to the drawings, and more particularly to FIGS. 1 and 2, there is generally indicated at 1 a swivel assembly of this invention for rotatably mounting a chair or seat, such as a boat seat 3, on a supporting structure, such as a thwart 5 of a boat. This assembly comprises a base plate 7 detachably mounted on the thwart, and a swivel plate 9 supporting the boat seat mounted on the base plate for rotation relative thereto in a plane generally parallel to but spaced above that of the base plate. Bearing means generally indicated at 11 is disposed between the opposing inner faces of the plates. A fastener generally indicated at 13 draws the plates 7, 9 together against the bearing means, with the plates being freely rotatable relative to the fastener.

Figure 3:
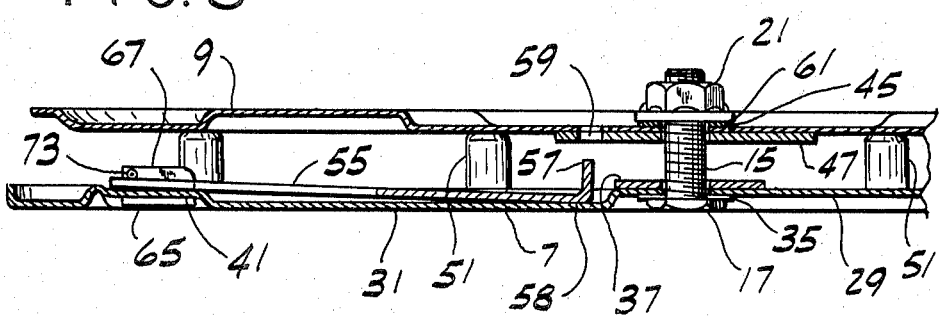
FIG. 3 is an enlarged section on line 3—3 of FIG. 2 showing a latch member of the swivel assembly in retracted position.

More specifically, the fastener 13 comprises a bolt 15 having a head 17 below the outer face (i.e., the lower face as shown in FIGS. 1 and 3) of the base plate 7, and a threaded shank extending up through axially aligned holes 19 in the plates and defining an axis about which the swivel plate 9 rotates. The fastener also includes a nut 21 threaded on the shank of the bolt above the outer face of the swivel plate (i.e., its upper face as shown in FIGS. 1-3). As described more fully hereinafter, locking means, generally designated 23, selectively holds the nut, which is rendered inaccessible by the boat seat 3, in fixed angular position relative to the swivel plate 9 to ensure relative rotation of the nut and bolt upon turning the head of the bolt, which is accessible from the outer face of the base plate upon removal of the swivel assembly from the boat thwart. The resistance of the swivel plate to rotation relative to the base plate may thus be adjusted by turning the bolt.

The base plate 7 is stamped from a generally square blank of suitable sheet metal such as galvanized sheet steel to form up-turned flanges 25 along the side edges of the base plate and end edge margins 27 adapted to be received beneath keepers (not shown) secured to the boat thwart for detachably mounting the base plate thereto. As illustrated in FIG. 1, the plate 7 also has a raised, generally circular central portion, designated 29, a recessed generally annular portion, designated 31, surrounding the raised central portion having four radially outwardly extending portions or lobes 32, and a raised outer portion, designated 33, around the recessed portion. As shown in FIG. 3, the bottom of the raised central portion 29 is spaced above that of the recessed portion 31 a distance sufficient to accommodate the head of the bolt and a washer 35 carried on the shank of the bolt. A reinforcing ring 37 is secured, as by welding, to the upper surface of the raised central portion 29. The recessed portion 31 at one of its lobes, designated 32a, extends radially inwardly thereby forming a rectangular recess designated 39 in the raised central portion 29, and has a slightly raised area or land 41 at its radial outer end. The outer raised portion 33 of the base plate has a plurality of holes 43 therein (e.g., eight holes, as illustrated) at spaced intervals around its periphery.

The swivel plate 9 is stamped from a generally circular blank of the same sheet metal as the base plate and its inner (i.e., lower) face is relieved in generally the same fashion as the inner (i.e., upper) face of the base plate. As shown in FIG. 3, the nut 21 bears on the outer surface of the swivel plate at a central portion thereof via a washer 45 carried on the bolt. A reinforcing ring, designated 47, is secured as by welding on the inner (i.e., lower) face of the central portion of the swivel plate. Slots 49 (four slots, as illustrated) are cut in the swivel plate and are adapted to receive conventional fasteners (not shown) for mounting the boat seat 3 on the swivel plate. As described above, the boat seat when mounted on the swivel plate renders the nut 21 inaccessible.

The bearing means 11 comprises a plurality of studs 51, one for each of the holes 43, of a suitable material having a low-coefficient of friction. The studs are mounted on the base plate with the swivel plate being slidable on the upper ends of the studs. Each stud 51 is generally cylindrical in shape and has a necked-down portion at its lower end forming a projection 53 sized to have a snug fit in its respective hole 43 in the base plate for securing the stud therein, and forming a shoulder for bearing on the inner face of the base plate 7. The distance, designated D, between the shoulder and the upper end of each stud is such that sufficient space is provided between the plates 7, 9 to accommodate certain components of the locking means 23.

In accordance with this invention, the locking means 23 comprises an elongate latch member 55 mounted at one end thereof on the base plate for pivotal movement between retracted and locking positions and having at its other end a relatively narrow projection 57 constituting a locking pin and a tapered or chamfered lower edge 58. Means 23 further comprises an opening 59 in the swivel plate for receiving the locking pin when the latch member is in its locking position, and a locking bar 61 rigidly secured to the nut 21 engageable with the locking pin, when the latch member is in its locking position, to prevent rotation of the nut relative to the swivel plate.

Figure 4:
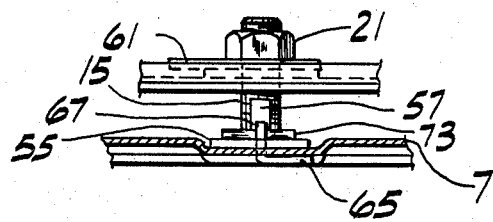
FIG. 4 is an enlarged section on line 4—4 of FIG. 2.

More particularly, the latch member 55 is received in the recessed portion 31 in the base plate at lobe 32a thereof and extends radially with respect to the swivel assembly, with its outer end pivoted on a mounting lug 63 on the base plate and with the locking pin 57 disposed closely adjacent the bolt 15. As illustrated in FIGS. 2-4, the mounting lug 63 is a generally L-shaped member having a relatively large horizontal base leg 65 which is secured (e.g., welded) to the underside of the partially raised area or land 41 of the lobe 32a, and a vertical leg 67 which extends up through a slot in the raised area 41 and a slot 71 in the latch member extending longitudinally thereof. The latch member is held captive on the vertical leg of the lug by a pin 73 extending through a hole in the leg above the latch member. The pin, which extends transversely with respect to the latch member, also defines an axis about which the latch member generally pivots. The slot 71 in the latch member is sized for a relatively close clearance fit with the vertical leg, the inner (right as viewed in FIG. 3) end of which is curved on an arc centered on the pivot axis of the latching member. The close clearance fit between the edges of the slot and the vertical leg of the lug ensures a consistency of movement of the latch member as it pivots. As described more fully hereinafter, the latch member 55 is pivoted between its retracted and locking positions by inverting the swivel assembly 1.

Figure 5:
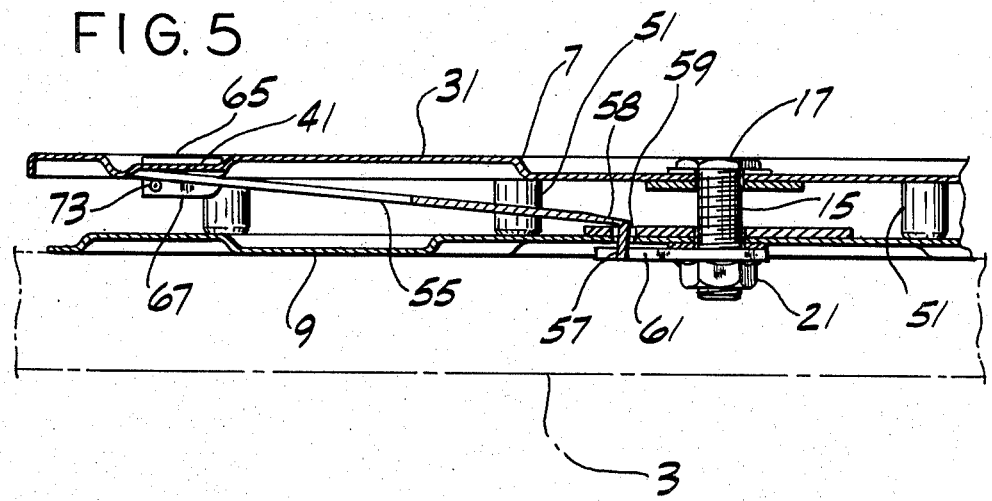
FIG. 5 is a view similar to FIG. 3 but with the swivel assembly in inverted position and the latch member in locking position.

The locking bar 61 comprises a generally rectangular plate of suitable metal, such as galvanized steel, having an opening at one end in which the nut 21 is secured, as by welding. This bar thus projects laterally from the nut and sweeps over a generally central circular portion, shown in phantom at 77 in FIG. 2, of the outer face of the swivel plate 9 upon rotation of the nut relative thereto. The opening 59 in the swivel plate receiving the locking pin 57 is located within this circular area. This, with the locking pin 57 extending through the opening 59 and projecting outwardly beyond the outer face of the swivel plate, as shown in FIG. 5, the locking bar 61 engages the locking pin for holding the nut in fixed position relative to the swivel plate to ensure relative rotation of the nut and bolt upon turning the bolt.

As shown in FIG. 2, the swivel assembly 1 is mounted on the boat thwart 5 in upright position, with the base plate 7 resting on the boat thwart 5, the swivel plate 9 above the base plate, and the boat seat 3 above the swivel plate. In the upright position of the assembly, the latch member, as shown in FIG. 3, is gravity-biased to its retracted position in which its tapered lower edge 58 bears on the base plate and its locking pin 57 is spaced below the swivel plate, the swivel plate thus being free to rotate relative to the base plate. The swivel assembly 1, upon being removed from the thwart, may be held in inverted position with the base plate 7 above the swivel plate 9. In the inverted position of the assembly, the latch member, as shown in FIG. 5, is gravity-biased to its locking position in which the locking pin 57 extends through and projects below the opening 59 in the swivel plate and is engageable by the locking bar 61 to ensure rotation of the nut relative to the bolt on turning the head 17 of the latter.

In use, as mounted on the boat thwart 5 and supporting the boat seat 3, the swivel assembly enables rotation of the boat seat for a full 360° of rotation. During such rotation, the head 17 of the bolt and the nut 21 are free to rotate relative to the base and swivel plates for reducing wear. If, over time, the resistance to rotation of the boat seat 3 provided by the swivel assembly 1 becomes unsatisfactory, the resistance may be adjusted by removing the swivel assembly 1 and the boat seat 3 as an integral unit from the boat thwart, and then inverting this unit to bias the latch member 55 toward its locking position. The base plate 7 is then rotated relative to the swivel plate until it reaches the angular position at which the locking pin 57 is in register with and drops in the opening 59 in the swivel plate. With the locking pin 57 in the opening 59, further relative rotation of the plates is not possible. Thereafter, the head 17 of the bolt is turned by a suitable tool to tighten the nut on the bolt to draw the swivel plate 9 against the studs 51 and thus adjust the resistance of the swivel plate to rotation. The tendency of the nut 21 to turn with the bolt 15 is prevented by the engagement of the locking bar 61 with the locking pin 57. With its resistance to rotation adjusted, the swivel assembly 1, with the boat seat still secured thereto, is returned to its upright position and mounted on the boat thwart 5. With the assembly in upright position, the latch member returns to its retracted position and the swivel plate is again free to rotate relative to the base plate 7 and the nut 21.

While the fastener 13 has been described above and shown in the drawings as being oriented with the nut and the head of the bolt on the outer faces of the swivel and base plates, respectively, it is to be understood that this could be reversed. If such a reversal were made, the locking bar 61 would be secured to the head of the bolt. Moreover, while the swivel assembly 1 has been described above and shown in the drawings as being mounted on a boat thwart and supporting a boat seat, it is to be understood that the assembly could be secured on any suitable support and carry any suitable object. Lastly, while the locking pin 57 has been described above and shown in the drawings as being connected to the base plate via the latch member 55, it is to be understood that the locking pin could be separate from the plates, and that the base plate could have an opening therein which, upon relative rotation of the plates, can be brought into axial alignment with the opening 59 in the swivel plate. The locking pin could then be manually inserted from the outer face of the base plate through the the two aligned holes into a position in which it projects beyond the outer face of the swivel plate for engagement by the locking bar 61.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A swivel assembly comprising:
   a base plate;
   a swivel plate mounted on the base plate for rotation relative to the base plate in a plane generally parallel to but spaced from that of the base plate;
   bearing means between the opposing inner faces of the plates;
   means for adjusting the resistance of the swivel plate to rotation relative to the base plate comprising first and second fastening members, the first fastening member comprising a bolt having a head on the outer face of one plate, and a threaded shank extending through axially aligned holes in the plates and defining an axis about which the swivel plate rotates, and the second fastening member comprising a nut on the outer face of the other plate threadable on the shank of the bolt for drawing the swivel plate toward the base plate against said bearing means thereby to adjust the resistance of the swivel plate to rotation relative to the base plate, both fastening members being freely rotatable relative to said plates, one of the fastening members being accessible for being turned from the outer face of the base plate and the other fastening member being rendered generally inaccessible by an object mounted on the outer face of the swivel plate;
   and locking means for selectively holding the inaccessible fastening member in fixed angular position relative to the swivel plate to ensure relative rotation of the fastening members upon turning the accessible fastening member, whereby the resistance of the swivel plate to rotation may be adjusted.

2. A swivel assembly as set forth in claim 1 wherein the locking means comprises a locking bar projecting laterally from the inaccessible fastening member, said locking bar being adapted to sweep over a generally central circular portion of the outer face of the swivel plate upon rotation of the inaccessible fastening member relative to the swivel plate.

3. A locking assembly as set forth in claim 2 wherein the locking bar comprises a generally rectangular plate secured at one end to the inaccessible fastening member.

4. A swivel assembly as set forth in claim 2 wherein the locking means further comprises an opening in the swivel plate at said central portion thereof adapted to receive a locking pin extending therethrough and projecting outwardly beyond the outer surface of the swivel plate for engagement by the locking bar to prevent rotation of the inaccessible fastening member relative to the swivel plate.

5. A swivel assembly as set forth in claim 4 wherein the locking means further comprises an elongate latch member disposed between said plates, said latch member being pivotally mounted at one end thereof on the inner face of the base plate and having a locking pin on its other end extending toward the swivel plate, the latch member being pivotable between a retracted position in which the locking pin is removed from the opening in the swivel plate, the inaccessible fastening member thereby being free to rotate relative to the swivel plate, and a locking position in which the locking pin projects through the opening and outwardly beyond the opening for engagement by the locking bar to prevent rotation of the inaccessible fastening means relative to the swivel plate.

6. A swivel assembly as set forth in claim 5 wherein the swivel assembly is adapted to be normally supported in an upright position with the swivel plate above the base plate, and is adapted also to be held in an inverted position with the base plate above the swivel plate, the latch member being biased to its retracted position when the swivel assembly is in its upright position and being biased to its locking position when the swivel assembly is in its inverted position.

7. A locking assembly as set forth in claim 5 wherein the latch member has a slot therein at its pivoted end extending longitudinally of the latch member, said base plate having a mounting lug extending through the slot having a pivot pin extending laterally thereof transversely with respect to the latch member for defining an axis about which the latch member pivots.

8. A swivel assembly as set forth in claim 5 wherein the latch member extends radially with respect to the axis of rotation of the swivel plate, with the end of the latch member carrying the locking pin being disposed closely adjacent said axis.

9. A locking assembly as set forth in claim 1 wherein the bearing means comprises a plurality of studs mounted on the base plate and having low-coefficient of friction material at their ends toward the swivel plate.

10. A locking assembly as set forth in claim 9 wherein each stud is necked down at its other end to form a projection adapted to be secured in a hole in the base plate and a shouldered portion adapted to bear on the inner face of the base plate.

11. A locking pin as set forth in claim 10 wherein the studs are generally cylindrical, and wherein the holes receiving the studs are at spaced intervals around the base plate generally adjacent the periphery thereof.

12. A swivel assembly as set forth in claim 1 wherein the head of the bolt is on the outer face of the base plate and thus constitutes the accessible fastening member, and the nut is on the outer face of the swivel plate and thus constitutes the inaccessible fastening member.

* * * * *